US008755145B2

(12) United States Patent
Matsumoto et al.

(10) Patent No.: US 8,755,145 B2
(45) Date of Patent: Jun. 17, 2014

(54) BASE UNIT, MOTOR AND DISK DRIVE APPARATUS

(71) Applicant: Nidec Corporation, Kyoto (JP)

(72) Inventors: Takuro Matsumoto, Kyoto (JP);
Toshihiro Akiyama, Kyoto (JP);
Atsushi Yawata, Kyoto (JP)

(73) Assignee: Nidec Corporation, Kyoto (JP)

( * ) Notice: Subject to any disclaimer, the term of this patent is extended or adjusted under 35 U.S.C. 154(b) by 0 days.

(21) Appl. No.: 13/770,355

(22) Filed: Feb. 19, 2013

(65) Prior Publication Data
US 2014/0009852 A1    Jan. 9, 2014

Related U.S. Application Data

(60) Provisional application No. 61/668,601, filed on Jul. 6, 2012.

(51) Int. Cl.
G11B 33/12    (2006.01)
G11B 19/20    (2006.01)
H02K 3/50    (2006.01)
H02K 5/22    (2006.01)

(52) U.S. Cl.
USPC .................. 360/99.08; 360/99.16; 360/98.07; 310/71

(58) Field of Classification Search
CPC .. G11B 19/2009; G11B 25/043; G11B 33/12; H02K 5/225; H02K 3/50
USPC .............. 360/99.15, 99.16, 99.23–25, 99.08; 310/71, 90
See application file for complete search history.

(56) References Cited

U.S. PATENT DOCUMENTS 7,012,191 B1    3/2006  Watanabe et al.
7,940,493 B2 *  5/2011  Tamaoka et al. ........... 360/99.08
8,120,872 B2    2/2012  Sekii et al.
(Continued)

FOREIGN PATENT DOCUMENTS

JP    05-207717 A    8/1993
JP    05-070184 U    9/1993
(Continued)

OTHER PUBLICATIONS

Sekii et al., "Motor and Disk Drive Apparatus", U.S. Appl. No. 13/564,934, filed Aug. 2, 2012.
(Continued)

Primary Examiner — Will J Klimowicz
(74) Attorney, Agent, or Firm — Keating & Bennett, LLP

(57) ABSTRACT

A base unit includes a stator and a base member including a first recess portion, a second recess portion, and at least one through-hole. The first recess portion is arranged on an upper surface of the base member to surround the hole portion and depressed toward the lower surface thereof. The second recess portion is arranged radially outward of the first recess portion and depressed toward a lower surface thereof. The through-hole is arranged inside the first recess portion to extend through the base member. The second recess portion includes a protrusion portion and a third recess portion. The protrusion portion protrudes from the lower surface of the base member toward the upper surface of the base member. The third recess portion is depressed from the lower surface of the base member toward the upper surface of the base member and positioned at the opposite side from the protrusion portion.

54 Claims, 7 Drawing Sheets

(56) References Cited

U.S. PATENT DOCUMENTS

| | | | |
|---|---|---|---|
| 8,164,851 B2 * | 4/2012 | Yoneda et al. | 360/99.08 |
| 8,299,668 B2 * | 10/2012 | Yawata et al. | 310/71 |
| 8,304,945 B2 * | 11/2012 | Yawata et al. | 310/71 |
| 8,363,352 B2 | 1/2013 | Kang | |
| 8,416,524 B2 * | 4/2013 | Saichi et al. | 360/99.08 |
| 8,446,059 B2 * | 5/2013 | Yawata et al. | 310/71 |
| 2006/0138886 A1 | 6/2006 | Ito et al. | |
| 2006/0265871 A1 | 11/2006 | Ito et al. | |
| 2007/0247010 A1 | 10/2007 | Ichizaki | |
| 2007/0278880 A1 | 12/2007 | Wada et al. | |
| 2008/0019038 A1 | 1/2008 | Xu et al. | |
| 2008/0084142 A1 | 4/2008 | Ino et al. | |
| 2010/0177627 A1 | 7/2010 | Ino et al. | |
| 2010/0329104 A1 * | 12/2010 | Yawata et al. | 369/264 |
| 2011/0122530 A1 * | 5/2011 | Sekii et al. | 360/99.08 |
| 2011/0216442 A1 * | 9/2011 | Uchibori et al. | 360/99.08 |
| 2011/0249362 A1 * | 10/2011 | Saichi et al. | 360/99.08 |
| 2012/0075746 A1 * | 3/2012 | Yoneda et al. | 360/99.08 |
| 2012/0200957 A1 * | 8/2012 | Yawata | 360/99.08 |
| 2013/0038964 A1 * | 2/2013 | Garbarino et al. | 360/99.08 |

FOREIGN PATENT DOCUMENTS

| | | | |
|---|---|---|---|
| JP | 05-316704 A | | 11/1993 |
| JP | 06-343242 A | | 12/1994 |
| JP | 08-033253 A | | 2/1996 |
| JP | 08-237899 A | | 9/1996 |
| JP | 08-275439 A | | 10/1996 |
| JP | 10-108424 A | | 4/1998 |
| JP | 2003-153481 A | | 5/2003 |
| JP | 2005-253239 A | | 9/2005 |
| JP | 2006238666 A | * | 9/2006 |
| JP | 2007-295666 A | | 11/2007 |
| JP | 2008-005588 A | | 1/2008 |
| JP | 2008-092714 A | | 4/2008 |
| JP | 2009-110611 A | | 5/2009 |
| JP | 2011-114892 A | | 6/2011 |
| JP | 2011234602 A | * | 11/2011 |
| JP | 2012-005339 A | | 1/2012 |
| JP | 2012160225 A | * | 8/2012 |

OTHER PUBLICATIONS

Saeki et al., "Spindle Motor and Disk Drive Apparatus", U.S. Appl. No. 13/767,228, filed Feb. 14, 2013.

Saeki et al.,"Base Unit", U.S. Appl. No. 13/770,374, filed Feb. 19, 2013.

Fujinawa et al., "Base Member, Motor, and Disk Drive Apparatus", U.S. Appl. No. 13/770,395, filed Feb. 19, 2013.

Tamaoka et al., "Motor and Disk Drive Apparatus", U.S. Appl. No. 13/564,900, filed Aug. 2, 2012.

Saeki et al., "Stopper, Motor, and Disk Drive Apparatus", U.S. Appl. No. 13/767,194, filed Feb. 14, 2013.

Masumi et al., "Base Plate, Base Unit, Motor, Disk Drive Apparatus and Method of Manufacturing the Base Plate", U.S. Appl. No. 13/789,974, filed Mar. 8, 2013.

Tatsumi et al., "Base Plate, Base Unite, Motor and Disk Drive Apparatus", U.S. Appl. No. 13/788,140, filed Mar. 7, 2013.

Shiraishi et al., "Motor and Disk Drive Apparatus", U.S. Appl. No. 13/783,733, filed Mar. 4, 2013.

Sato et al., "Spindle Motor and Disk Drive Apparatus", U.S. Appl. No. 13/780,447, filed Feb. 28, 2013.

Matsumoto et al., "Spindle Motor and Disk Drive Apparatus", U.S. Appl. No. 13/792,448, filed Mar. 11, 2013.

Matsumoto et al., "Spindle Motor and Disk Drive Apparatus", U.S. Appl. No. 13/792,400, filed Mar. 11, 2013.

Matsumoto et al., "Base Unit, Motor and Disk Drive Apparatus", U.S. Appl. No. 13/785,194, filed Mar. 5, 2013.

Matsumoto et al.,"Spindle Motor and Disk Drive Apparatus", U.S. Appl. No. 13/798,842, filed Mar. 13, 2013.

Sato et al., "Spindle Motor and Disk Drive Apparatus", U.S. Appl. No. 13/798,827, filed Mar. 13, 2013.

Ishino et al., "Motor and Disk Drive Apparatus", U.S. Appl. No. 13/794,864, filed Mar. 12, 2013.

* cited by examiner

BASE UNIT, MOTOR AND DISK DRIVE APPARATUS

BACKGROUND OF THE INVENTION

1. Field of the Invention

The present invention relates to a base unit for use in a motor and a disk drive apparatus.

2. Description of the Related Art

Conventionally, a disk drive apparatus such as a hard disk drive apparatus or the like is equipped with a spindle motor for rotating a disk. The disk drive apparatus includes a disk, a housing, a stator, a FPC (Flexible Printed Circuit), and so forth. The housing includes a cover member, a base member, and so forth.

In recent years, the disk drive apparatus is required to become smaller in height and size. Particularly, in order to further reduce the height of a 2.5 inch disk drive apparatus of 7 mm thickness which is used in small-size disk drive apparatuses, it is necessary to reduce the thickness of a housing or a motor arranged within the housing. In general, the motor includes a rotor hub, a coil, a stator core, a wiring substrate, a base member, etc. When assembling the motor, these components are arranged to axially overlap with one another. For the sake of reducing the thickness of the motor, these components need to be made thin. However, if an attempt is made to reduce the overall height of the motor by reducing the turn number of the coils or the lamination number of the stator core, the magnetic fluxes generated in the stator during the operation of the motor are reduced such that the torque constant is reduced. It is therefore impossible to obtain the torque required in rotating the disk attached to the rotor hub.

In order to reduce the height of the motor, it is therefore necessary to reduce the thickness of the base member, among the components of the motor, which occupies a large proportion in the axial dimension of the motor. However, if the base member is merely made thin, the rigidity of the base member is reduced to a great extent. As a result, if a shock or force is applied from the outside to the base member, it is likely that the base member is broken and that the disk arranged within the housing is damaged.

Accordingly, a demand has existed for a structure capable of obtaining the rigidity of the base member while reducing the overall height of the motor.

SUMMARY OF THE INVENTION

A base unit according to a first illustrative preferred embodiment of the present invention includes a stator including a plurality of coils and a thin base member. The base member includes a first recess portion, a second recess portion, and at least one through-hole. A hole portion is arranged in the base member. A center axis passes through the hole portion 210. The first recess portion is arranged on an upper surface of the base member to surround the hole portion. The first recess portion is accommodated at least a portion of the stator. The first recess portion is depressed toward a lower surface of the base member. The second recess portion is arranged radially outward of the first recess portion on the upper surface of the base member. The second recess portion is depressed toward the lower surface of the base member. The through-hole is arranged in the first recess portion to extend through the upper surface of the base member and the lower surface of the base member. The second recess portion includes a protrusion portion and a third recess portion. The protrusion portion is arranged on an upper inner surface of the second recess portion to protrude from the lower surface of the base member toward the upper surface of the base member. The third recess portion is depressed from the lower surface of the base member toward the upper surface of the base member in a lower-surface-side peripheral edge portion of the second recess portion. The third recess portion is positioned at the opposite side from the protrusion portion.

A base unit according to a second illustrative preferred embodiment of the present invention includes a thin base member, a stator including a plurality of coils, and a wiring substrate arranged on a lower surface of the base member and electrically connected to the stator. The base member includes a hole portion through which a center axis passes, a first recess portion, a second recess portion, and at least one through-hole. The first recess portion is arranged on an upper surface of the base member to surround the hole portion and to accommodate at least a portion of the stator and is depressed toward the lower surface of the base member. The second recess portion is arranged radially outward of the first recess portion on the upper surface of the base member and is depressed toward the lower surface of the base member. The through-hole is arranged in the first recess portion to extend through the upper surface of the base member and the lower surface of the base member. The second recess portion includes a third recess portion. The third recess portion is depressed from the lower surface of the base member toward the upper surface of the base member in a lower-surface-side peripheral edge portion of the second recess portion. The third recess portion includes a lower slant surface. The wiring substrate includes an electrode portion arranged in a position corresponding to the lower slant surface. The coils include a lead wire led out from the upper surface of the base member to the lower surface of the base member through the through-hole. The lead wire is connected to the electrode portion of the wiring substrate.

A motor according to a third illustrative preferred embodiment of the present invention includes a stationary unit including a base unit and a rotary unit including a rotor magnet, the rotary unit being arranged to rotate with respect to the stationary unit about a center axis. The base unit includes a thin base member, a stator including a plurality of coils, and a wiring substrate. The wiring substrate is arranged on a lower surface of the base member and is electrically connected to the stator. The base member includes a hole portion through which a center axis passes, a first recess portion, a second recess portion, and at least one through-hole. The first recess portion is arranged on an upper surface of the base member to surround the hole portion and to accommodate at least a portion of the stator and is depressed toward the lower surface of the base member. The second recess portion is arranged radially outward of the first recess portion on the upper surface of the base member and is depressed toward the lower surface of the base member. The through-hole is arranged in the first recess portion to extend through the upper surface of the base member and the lower surface of the base member. The second recess portion includes a protrusion portion and a third recess portion. The protrusion portion is arranged on an upper inner surface of the second recess portion to protrude from the lower surface of the base member toward the upper surface of the base member. The third recess portion is depressed from the lower surface of the base member toward the upper surface of the base member in a lower-surface-side peripheral edge portion of the second recess portion and is positioned at the opposite side from the protrusion portion. The upper inner surface of the second recess portion including the protrusion portion is axially opposed to the rotary unit.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

In the following description, the upper side in FIG. 1 along a center axis direction of a motor will be just referred to as "upper" and the lower side as "lower". The up-down direction is not intended to indicate the positional relationship or the orientation when the motor is installed within an actual device. The direction parallel or substantially parallel to the center axis will be referred to as "axial". The radial direction about the center axis will be just referred to as "radial". The circumferential direction about the center axis will be just referred to as "circumferential".

Figure 1:
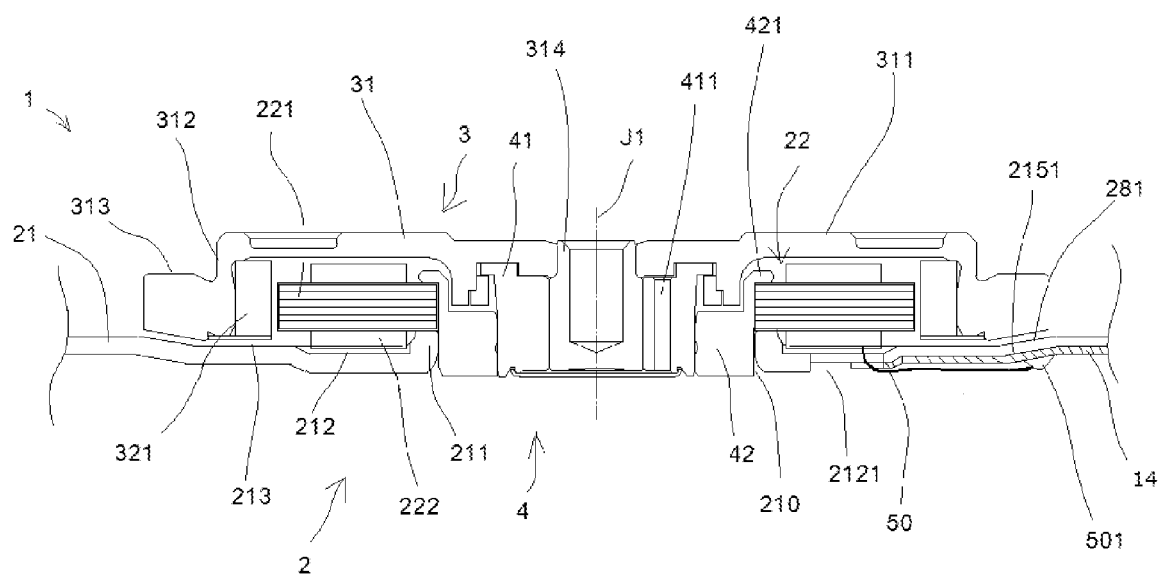
FIG. 1 is a sectional view showing a motor according to a preferred embodiment of the present invention.

FIG. 1 is a sectional view of a spindle motor 1 according to one illustrative preferred embodiment of the present invention. In the following description, the spindle motor 1 will be just referred to as "motor 1". The motor 1 is preferably used in a 2.5 inch disk drive apparatus (e.g., a hard disk drive apparatus) having a thickness of about 7 mm or less or a thickness of about 5 mm or less. The disk drive apparatus preferably includes a motor 1, a housing, at least one disk, an access unit, a connector, and so forth. The disk is attached to the motor 1. The access unit performs at least one of information reading and writing tasks with respect to the disk. A base member defines a portion of the housing in cooperation with a cover member. The housing accommodates the motor 1, the disk and the access unit therein.

As shown in FIG. 1, the motor 1 is preferably of an outer-rotor-type. In the present preferred embodiment, the motor 1 is preferably a three-phase motor having three phases, namely U, V, and W phases. Preferably, the motor 1 is a three-phase brushless motor. The motor preferably includes a stationary unit 2 as a fixed assembly, a rotary unit 3 as a rotating assembly, and a fluidic dynamic-pressure bearing mechanism (hereinafter referred to as "bearing mechanism 4"). By virtue of the bearing mechanism 4, the rotary unit 3 is rotatably supported with respect to the stationary unit 2 to rotate about the center axis J1 of the motor 1.

The stationary unit 2 preferably includes a thin base member 21, a ring-shaped stator 22, and a wiring substrate 14. A hole portion 210 is arranged in the base member 21 to axially extend through the base member 21. The aforementioned center axis J1 passes through the center of the hole portion 210. A tubular portion 211 having a cylindrical or substantially cylindrical shape is preferably arranged substantially at the center of the base member 21. At the side of the upper surface of the base member 21, the tubular portion 211 axially extends from the edge of the hole portion 210. The stator 22 is arranged around the tubular portion 211. The stator 22 preferably includes a stator core 221 and coils 222. The coils 222 are arranged in the stator core 221. In the stator 22, a plurality of lead wires 50 led out from the U, V, and W phase coils are electrically connected to the wiring substrate 14. The respective lead wires 50 are preferably connected to the wiring substrate 14 by, e.g., soldering. In the present preferred embodiment, the number of the lead wires 50 is preferably three, for example. The base unit of the present preferred embodiment preferably includes a plurality of coils 222, a base member 21, and a wiring substrate 14.

A flexible printed circuit board can be taken as one preferred example of the wiring substrate 14. The wiring substrate 14 is arranged on the lower surface of the base member 21. A portion of the wiring substrate 14 may or may not make contact with the lower surface of the base member 21.

The stator core 221 preferably includes a core-back (not shown) and a plurality of teeth (not shown). The core-back is arranged into a ring shape about the center axis J1. The teeth extend radially outward from the outer circumference of the core-back. Each of the teeth preferably includes a winding portion and a tip end portion. A conductive wire is wound on the winding portion so as to define each of the coils 222. The tip end portion extends from the outer edge portion of the winding portion in the circumferential opposite directions.

As shown in FIG. 1, the rotary unit 3 preferably includes a rotor hub 31 and a rotor magnet 321. The rotor hub 31 preferably includes a hub body 311, a cylinder portion 312, a ring-shaped disk placing portion 313, and a shaft 314. The cylinder portion 312 protrudes downward from the outer edge portion of the hub body 311. The disk placing portion 313 extends radially outward from the lower portion of the cylinder portion 312. A disk is placed on the disk placing portion 313. The rotor magnet 321 has an annular or substantially annular shape about the center axis J1. The rotor magnet 321 is arranged inside the cylinder portion 312. The disk placing portion 313 is positioned radially outward of the lower portion of the rotor magnet 321. The rotor magnet 321 is arranged radially outward of the stator 22. In the motor 1, torque is generated between the rotor magnet 321 and the stator 22. The shaft 314 is fixed to the hub body 311. During rotation of the rotary unit 3, the shaft 314 rotates about the center axis J1.

As shown in FIG. 1, the bearing mechanism 4 is preferably a fluidic dynamic-pressure bearing. The bearing mechanism 4 preferably includes a lubricant, a sleeve 41, and a bushing 42. The sleeve 41 is a cylindrical or substantially cylindrical member. The sleeve 41 is preferably made of, e.g., a sintered metal formed by, for example, baking and solidifying metal powder. The sleeve 41 preferably includes a communication hole 411 extending through the sleeve 41 in the up-down direction. The sleeve 41 is preferably impregnated with a lubricant. The bushing (tubular member) 42 has a cylindrical or substantially cylindrical shape. The inner surface of the bushing 42 supports the sleeve 41. When the rotary unit 3 rotates with respect to the stationary unit 2, the sleeve 41 rotatably supports the shaft 314 through the lubricant. The stator core 221 is preferably fixed to the outer surface of the bushing 42 by, for example, press-fitting or caulking. The bushing 42 is preferably fixed to the inner surface of the tubular portion 211 by, for example, press-fitting or the like. A step portion 421 is arranged on the outer surface of the bushing 42. The step portion 421 is axially opposed to the hub body 311. The stator core 221 makes contact with the step portion 421 in the axial direction. The bushing 42 is preferably, press-fitted to the stator core 221, for example. The outer surface of the bushing 42 is radially opposed to the inner surface of the core-back of the stator core 221.

Figure 2:
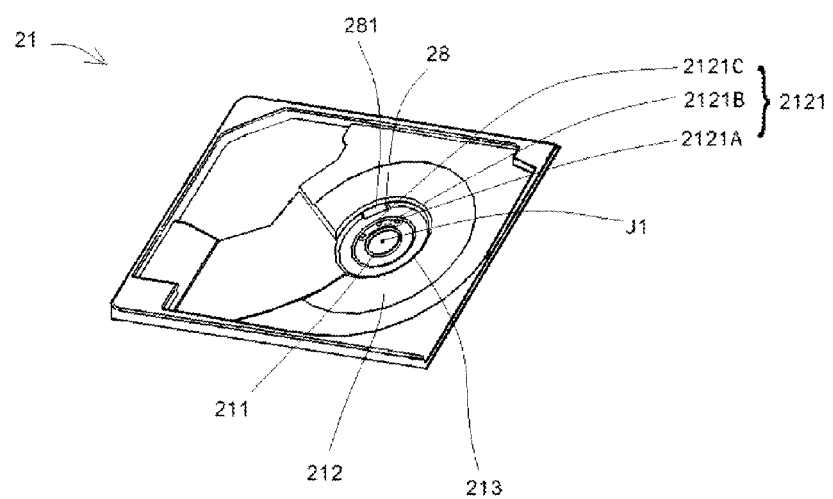
FIG. 2 is a top perspective view of a base member according to a preferred embodiment of the present invention.
Figure 3:
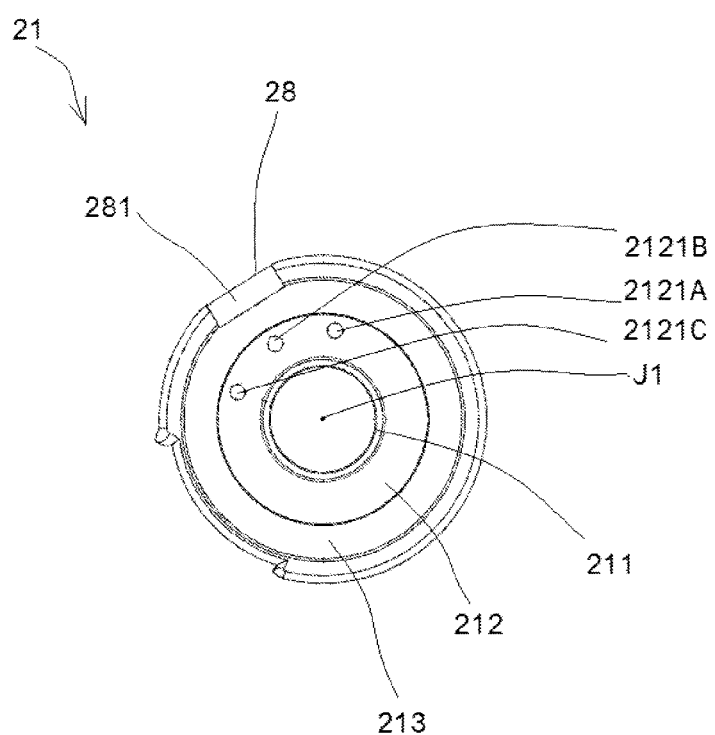
FIG. 3 is a partially enlarged top view of the base member according to a preferred embodiment of the present invention.

FIG. 2 is a perspective view of the base member 21, depicting the upper surface side of the base member 21. FIG. 3 is an enlarged view of the tubular portion 211 of the base member 21, depicting the upper surface side of the base member 21. As shown in FIGS. 2 and 3, the tubular portion 211 is arranged in the base member 21. A first recess portion 212 is arranged around the tubular portion 211. When axially seen, the first recess portion 212 preferably has an annular or substantially annular shape about the center axis J1. The first recess portion 212 is a portion arranged on the upper surface of the base member 21 and depressed toward the lower surface of the base member 21. The first recess portion 212 is arranged on the upper surface of the base member 21 so as to surround the hole portion 210. The first recess portion 212 preferably accommodates at least a portion of the stator 22. When assembling the motor 1, the inner surface of the first recess portion 212 is axially opposed to the disk placing portion 313. A second recess portion 213 is arranged radially outward of the first recess portion 212 to extend along the first recess portion 212. The second recess portion 213 is a portion arranged on the upper surface of the base member 21 and depressed toward the lower surface of the base member 21 (axially downward). The second recess portion 213 preferably surrounds the first recess portion 212. The second recess portion 213 preferably has an annular or substantially annular shape about the center axis J1.

As shown in FIGS. 2 and 3, at least one through-hole 2121 is preferably arranged in the first recess portion 212. The through-hole 2121 extends from the upper surface of the base member 21 to the lower surface of the base member 21. In FIGS. 2 and 3, three through-holes 2121 preferably are provided. The respective through-holes 2121 are preferably circumferentially spaced apart from one another. In other words, a first through-hole 2121A, a second through-hole 2121B, and a third through-hole 2121C are preferably sequentially arranged along the circumferential direction within the first recess portion 212. The radial distances from the center axis J1 to the respective through-holes 2121 are equal to one another. The first through-hole 2121A, the second through-hole 2121B and the third through-hole 2121C are arranged on a concentric circle about the center axis J1.

A protrusion portion 28 is arranged on the upper inner surface of the second recess portion 213. The protrusion portion 28 protrudes from the lower surface of the base member 21 toward the upper surface thereof. The protrusion portion 28 extends in the circumferential direction along the inner surface of the second recess portion 213. The protrusion portion 28 includes an upper slant surface 281 inclined with respect to the center axis J1.

Figure 4:
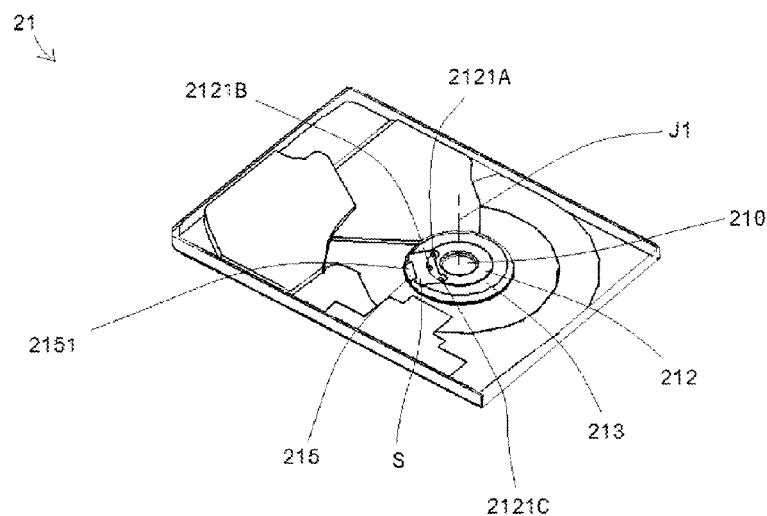
FIG. 4 is a bottom perspective view of the base member according to a preferred embodiment of the present invention.
Figure 5:
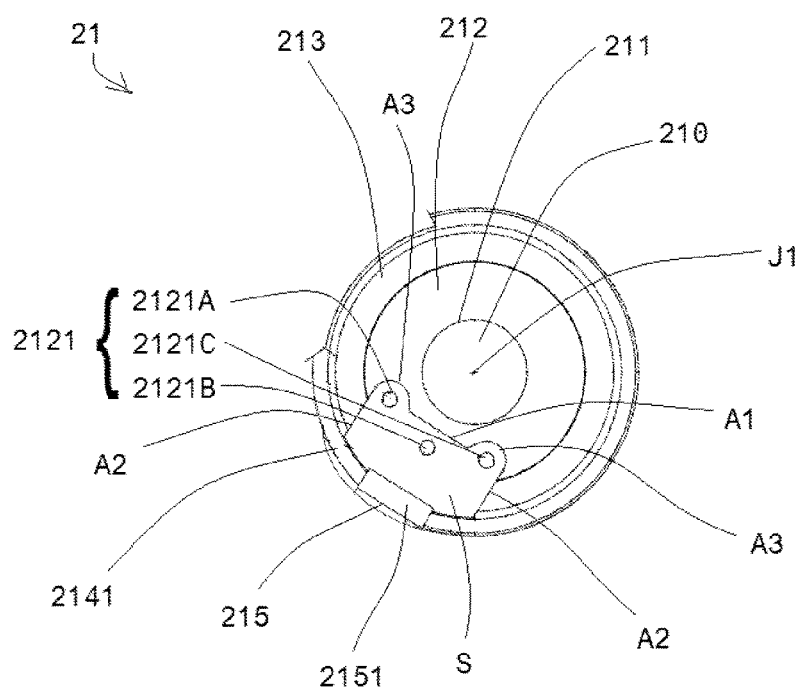
FIG. 5 is a partially enlarged bottom view of the base member according to a preferred embodiment of the present invention.

FIG. 4 is a bottom perspective view of the base member 21. FIG. 5 is an enlarged view of the tubular portion 211. As shown in FIGS. 1, 4, and 5, the bottom of the first recess portion 212 and the bottom of the second recess portion 213 protrude axially below the lower surface of the base member 21. The bottom of the second recess portion 213 is preferably positioned axially above the bottom of the first recess portion 212. In other words, the bottom of the first recess portion 212 protrudes axially below the bottom of the second recess portion 213. The bottom of the first recess portion 212 and the bottom of the second recess portion 213 preferably have an annular or substantially annular shape about the center axis J1. A third recess portion 215 is preferably arranged in the lower-surface-side peripheral edge portion 2141 of the second recess portion 213. The third recess portion 215 is depressed from the lower surface of the base member 21 toward the upper surface thereof. The circumferential position of the third recess portion 215 is preferably the same or substantially the same as the circumferential position of the protrusion portion 28. The radial position of the third recess portion 215 is preferably substantially the same as the radial position of the protrusion portion 28. In the axial direction, the third recess portion 215 is positioned at the opposite side from the protrusion portion 28.

Thus, the protrusion portion 28 serves as a so-called rib. As a result, even if the thickness of the base member 21 is made small, the rigidity of the periphery of the second recess portion 213 is prevented from going down.

On the lower surface of the base member 21, a coplanar surface S straddling both the bottom of the first recess portion 212 and the bottom of the second recess portion 213 is preferably provided.

The third recess portion 215 preferably includes a lower slant surface 2151 inclined with respect to the center axis J1. The lower slant surface 2151 is parallel or substantially parallel to the upper slant surface 281 of the protrusion portion 28. When axially seen, the contour of the lower slant surface 2151 preferably is rectangular or substantially rectangular.

As shown in FIGS. 4 and 5, the lower surface of the base member 21 positioned between the first through-hole 2121A and the second through-hole 2121B is preferably a portion of the coplanar surface S. The lower surface of the base member 21 positioned between the second through-hole 2121B and the third through-hole 2121C is preferably a portion of the coplanar surface S. The lower surface of the base member 21 positioned between the second through-hole 2121B and the bottom of the second recess portion 213 existing radially outward of the second through-hole 2121B is preferably a portion of the coplanar surface S. As shown in FIG. 5, the lower surface of the base member 21 positioned around the first through-hole 2121A is a portion of the coplanar surface S and is preferably shaped to extend along the edge of the first through-hole 2121A. The lower surface of the base member 21 positioned around the third through-hole 2121C is a portion of the coplanar surface S and is preferably shaped to extend along the edge of the third through-hole 2121C. The lower surface of the base member 21 positioned around the second through-hole 2121B is a portion of the coplanar surface S and is parallel or substantially parallel to a portion of the third recess portion 215.

More specifically, a portion of the bottom of the first recess portion 212 and a portion of the bottom of the second recess portion 213 are provided on the coplanar surface S. The coplanar surface S is preferably defined by a region surrounded by a peripheral edge portion 2141 of the second recess portion 213 including the third recess portion 215, a first side portion A1, and a pair of second side edges A2. The first side edge A1 is a portion radially opposed to the peripheral edge portion 2141 of the second recess portion 213. In the present preferred embodiment, the first side edge A1 and the second side edges A2 are preferably rectilinear or substantially rectilinear. The first side edge A1 is preferably perpendicular or substantially perpendicular to the second side edges A2. The first side edge A1 is preferably parallel or substantially parallel to at least one side of the lower slant surface 2151. Arc portions A3 interconnect the first side edge A1 and the second side edges A2. The arc portions A3 are circumferentially opposed to the first through-hole 2121A and the third through-hole 2121C. The arc portions A3 are positioned radially inward of the first side edge A1. The second through-hole 2121B is preferably positioned on an imaginary straight line interconnecting the center axis J1 and the third recess portion 215.

Alternatively, if so desired, the first side edge A1 and the second side edges A2 may be curvilinear, the first side edge A1 may not be parallel to the lower slant surface 2151, and the second side edges A2 may not be parallel to each other.

Figure 6:
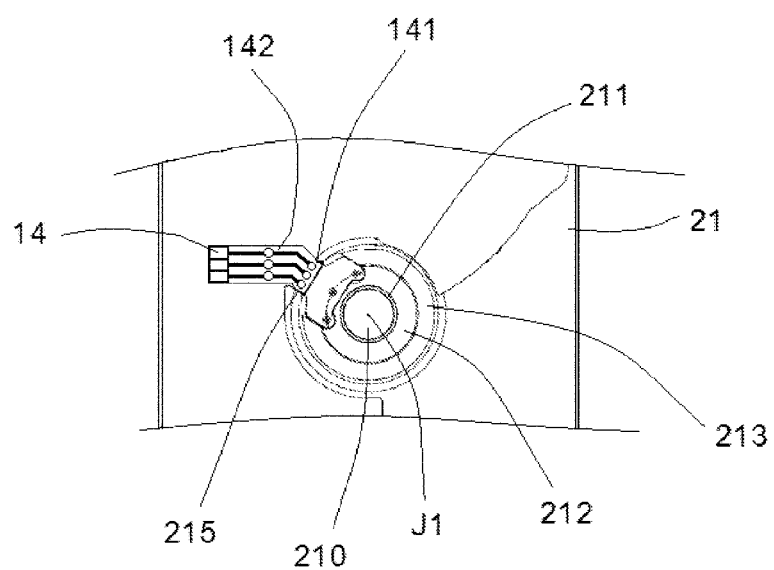
FIG. 6 is a partial bottom view of the base member according to a preferred embodiment of the present invention.

FIG. 6 is a partial bottom view of the base member 21. FIG. 6 illustrates a state that the wiring substrate 14 is arranged in the base member 21. As shown in FIGS. 1 and 6, the wiring substrate 14 is arranged on the lower surface of the base member 21. The wiring substrate 14 is preferably fixed to the lower surface of the base member 21 by way of a sticky material or an adhesive agent. A portion of the wiring substrate 14 is arranged on the coplanar surface S. The end portion of the wiring substrate 14 is preferably radially opposed to the bottom of the first recess portion 212. The wiring substrate 14 makes contact with a portion of the bottom of the first recess portion 212 and the bottom of the second recess portion 213 in the axial direction. The wiring substrate 14 preferably extends radially outward from the coplanar surface S to the lower surface of the base member 21 through the third recess portion 215. The wiring substrate 14 makes contact with the lower slant surface 2151 of the third recess portion 215. Lead wires 50 are preferably connected to the wiring substrate 14 on the lower slant surface 2151 of the third recess portion 215. The wiring substrate 14 preferably includes a first electrode portion 141 and a second electrode portion 142. The first electrode portion 141 is connected to the lead wires 50 to be described later. The first electrode portion 141 is positioned on the wiring substrate 14 arranged in the base member 21 and is arranged in a position where the lower slant surface 2151 exists. The first electrode portion 141 preferably includes electrodes corresponding to three phases, i.e., U, V, and W phases. The second electrode portion 142 is connected to an external power supply, thereby supplying electric power to the stator 22. The second electrode portion 142 preferably includes electrodes corresponding to three phases, i.e., U, V, and W phases. The second electrode portion 142 is positioned radially outward of the portion of the wiring substrate 14 where the third recess portion 215 is arranged.

Lead wires 50 are led out from the coils 222. In the present preferred embodiment, the motor 1 preferably is a three-phase motor. Thus, the lead wires 50 are led out one by one from U, V, and W phases. The respective lead wires 50 are led out from the upper surface of the base member 21 toward the lower surface thereof through the first through-hole 2121A, the second through-hole 2121B, and the third through-hole 2121C, respectively. On the lower surface of the base member 21, the lead wires 50 run on the coplanar surface S and go toward the position where the lower slant surface 2151 is provided. In the position where the lower slant surface 2151 exists, the lead wires 50 are electrically connected to the wiring substrate 14. The lead wires 50 are preferably connected to the wiring substrate 14 by, e.g., soldering (using a lead-containing solder or a lead-free solder). A fixing portion 501 shown in FIG. 1 is preferably formed by the soldering. The lower slant surface 2151 is positioned axially above the bottom of the first recess portion 212 and the bottom of the second recess portion 213. For that reason, if the lead wires 50 are connected to the wiring substrate 14 in the position where the lower slant surface 2151 is provided, the fixing portion 501 shown in FIG. 1 is positioned axially above the bottom of the first recess portion 212. As a result, the thickness of the motor 1 can be kept within the thickness of the base member 21.

At least a portion of the coplanar surface S is preferably covered with a resin material. The lead wires 50 arranged on the coplanar surface S are preferably fixed on the coplanar surface S by the resin material. The respective through-holes 2121 are closed by the resin material. Consequently, the lead wires 50 passing through the respective through-holes 2121 are fixed within the through-holes 2121. Thus, even if a shock or force is applied from the outside to the motor 1, the lead wires 50 are prevented from being pulled away from the wiring substrate 14 or the coplanar surface S. Since the respective through-holes 2121 are closed by the resin material, dust or the like is prevented from entering the inside of the motor 1 from the outside. Preferably, the resin material is an adhesive agent such as, for example, a thermosetting adhesive agent.

The base member 21 is preferably formed by a process including press working. First, a flat raw member is arranged within a mold. A series of press workings is performed with respect to the raw member, thereby forming the base member 21 which includes the tubular portion 211, the first recess portion 212, the second recess portion 213, the third recess portion 215, the through-holes 2121, and so forth. During the press workings, the protrusion portion 28 positioned at the axially opposite side of the third recess portion 215 is preferably formed simultaneously with the formation of the third recess portion 215 on the base member 21. For that reason, the shape of the protrusion portion 28 is substantially similar to the shape of the third recess portion 215.

In the base member 21 subjected to the press workings, a cutting is carried out on the inner surface of the tubular portion 211. Thus, the inner surface of the tubular portion 211 becomes smooth. As a result, the sleeve 41 is smoothly inserted into the tubular portion 211. Deformation or clogging of the sleeve 41 is preferably prevented during a process of press-fitting the sleeve 41.

On the lower surface of the base member 21, the coplanar surface S is preferably formed by a cutting such as, for example, milling or the like. Thus, the bottom of the first recess portion 212 and the bottom of the second recess portion 213 can preferably be made thin while still possessing a thickness capable of maintaining rigidity. As a result, it becomes possible to reduce the thickness of the disk drive apparatus including the motor 1.

A cutting may be performed with respect to the portions other than the tubular portion 211 and the coplanar surface S. For example, the portions other than the tubular portion 211, such as the entire upper surface and the entire lower surface of the base member 21, the first recess portion 212, the second recess portion 213, and the third recess portion 215, may be subjected to a cutting as well as a press working within a mold.

In the base member 21 subjected to the press working, undercuts or burrs are formed in the peripheral edge of the tubular portion 211, the ends of the through-holes 2121 and the outer edge of the base member 21 as the raw member is punched with the mold. In particular, a cutting may be performed with respect to the burrs formed by the press work. If the burrs are removed by the cutting, the end of the tubular portion 211 and the ends of the through-holes 2121 become smooth. Therefore, when assembling the base member 21, the components such as the stator 22 and the like are attached with no likelihood of getting damaged. By performing the press working, an undercut is formed at the end of the tubular portion 211 on the lower surface of the base member 21.

A plating work is performed with respect to the base member 21 which has been subjected to the press working and the cutting. For example, nickel-based metal is preferably used as a plating metal. By virtue of the plating work, the base member 21 is completely covered with a thin film of the plating metal. The thickness of the thin film may preferably be, from about 2 μm to about 10 μm, for example. Accordingly, it is possible to prevent the base member 21 from being corroded by the lubricant of the bearing mechanism 4 or due to the external environment.

While a preferred embodiment of the present invention has been described above, the present invention can be modified in many other different forms.

For example, only one through-hole 2121 may be provided in the first recess portion 212. In that case, the lead wires 50 extending from the coils 222 are guided to the single through-hole 2121 and are led out from the upper surface of the base member 21 to the lower surface thereof. Therefore, as compared with a case where a plurality of through-holes 2121 is provided, it is possible to increase the rigidity of the base member 21.

Even in case where a plurality of through-holes 2121 is provided in the first recess portion 212, there may be a through-hole 2121 to which the lead wires 50 are guided and a through-hole to which the lead wires 50 are not guided. Alternatively, a plurality of lead wires 50 may be guided to a single through-hole 2121.

In the aforementioned preferred embodiment, three-phase lead wires 50 of U, V, and W phases preferably are all connected to the wiring substrate 14. In that case, a common wire is preferably connected to the three lead wires 50 at the side of the stator 22 but is not directly connected to the wiring substrate 14. Alternatively, the common wire may be connected to the wiring substrate 14 in place of the stator 22. In that case, the number of the through-holes 2121 arranged in the first recess portion 212 can be set to four, including the ones for the three lead wires 50 and the one for the common wire. Also, as long as a short circuit or mutual contact is prevented, the common wire or one of the three lead wires 50 may be arranged within the same through-hole 2121 together with the remaining lead wires 50. This configuration makes it possible to reduce the number of the through-holes 2121. As a result, it is possible to minimize the reduction of rigidity of the base member 21 otherwise caused by the presence of the through-holes 2121.

When viewed axially, the through-holes 2121 preferably have an identical contour. However, the through-holes 2121 may differ in contour from one another. Also, the through-holes 2121 may differ in size and orientation from one another. For example, the first through-hole 2121A, the second through-hole 2121B, and the third through-hole 2121C may not be arranged on a concentric circle about the center axis J1. Alternatively, the positions of the first through-hole 2121A, the second through-hole 2121B, and the third through-hole 2121C may be deviated from the concentric circle. Additionally, adjoining ones of the through-holes 2121 may communicate with each other.

If there is only one through-hole 2121 provided, the lead wires 50 preferably extend from the upper surface of the base member 21 to the lower surface thereof through the through-hole 2121. In that case, it is not necessary to provide the arc portions A3 defining a portion of the contour of the coplanar surface S. The coplanar surface S may be defined by only the first side edge A1, the second side edges A2 connected to the first side edge A1, and the peripheral edge portion 2141 of the second recess portion 213. Moreover, only one arc portion A3 may be provided and the through-hole 2121 may be arranged in an opposing relationship with the arc portion A3.

In case where two through-holes 2121 are provided, arc portions A3 may be arranged in an opposing relationship with the two through-holes 2121. Alternatively, one arc portion A3 may be arranged in an opposing relationship with only one of the through-holes 2121.

The first side edge A1 may not be necessarily rectilinear but may be curvilinear. For example, the first side edge A1 may have a curved shape to extend along the tubular portion 211. The second side edges A2 may not be necessarily rectilinear but may be curvilinear. The second side edges A2 may differ in shape from each other.

In the aforementioned preferred embodiment, there is preferably only one protrusion portion 28 provided. However, the number of the protrusion portion 28 is not limited to one. A plurality of protrusion portions 28 may be arranged within the first recess portion 212. In that case, a plurality of third recess portions 215 is preferably arranged on the lower surface of the base member 21 in the positions corresponding to the positions of the protrusion portions 28. Each of the protrusion portions 28 may include an upper slant surface 281. There may be arranged a protrusion portion 28 including an upper slant surface 281 and a protrusion portion 28 including no upper slant surface 281. Among the plurality of third recess portions 215, the third recess portion 215 corresponding to the protrusion portion 28 including the upper slant surface 281 may have a lower slant surface 2151. The third recess portion 215 corresponding to the protrusion portion 28 including no upper slant surface 281 may not have a lower slant surface 2151.

The upper slant surface 281 of the protrusion portion 28 may be a surface inclined at a right angle with respect to the center axis J1. The lower slant surface 2151 of the third recess portion 215 may be a surface inclined at a right angle with respect to the center axis J1. In that case, the protrusion portion 28 and the third recess portion 215 preferably have a step shape.

The coplanar surface S may not be completely covered with the resin material. Instead, only the portions of the coplanar surface S where the through-holes 2121 are arranged may be covered with the resin material. Even in this case, the through-holes 2121 are preferably closed by the resin material. Thus, the lead wires 50 are fixed within the through-holes 2121. Dust or the like is prevented from infiltrating into the motor 1 from the outside through the through-holes 2121.

The coplanar surface S may be covered with a sealing material such as, for example, a sticky material or the like in place of the resin material. Even in this case, the through-holes 2121 are preferably closed by the sealing material. Therefore, dust or the like is prevented from infiltrating into the motor 1. The sealing material is preferably provided with holes or cutouts through which the lead wires 50 pass. Preferably, the sealing material has an electrically insulating property. The holes or cutouts of the sealing material through which the lead wires 50 pass are preferably covered with an adhesive agent.

As stated above, the motor 1 is a preferably three-phase motor. However, the number of phases of the motor 1 need not be particularly limited. For example, it may be possible to provide a single-phase motor or a multiple-phase motor such as, for example, a five-phase motor or a seven-phase motor. The number of the through-holes 2121 arranged in the first recess portion 212 may be changed in conformity with the number of the lead wires 50 or the handling method of the common wire.

Figure 7:
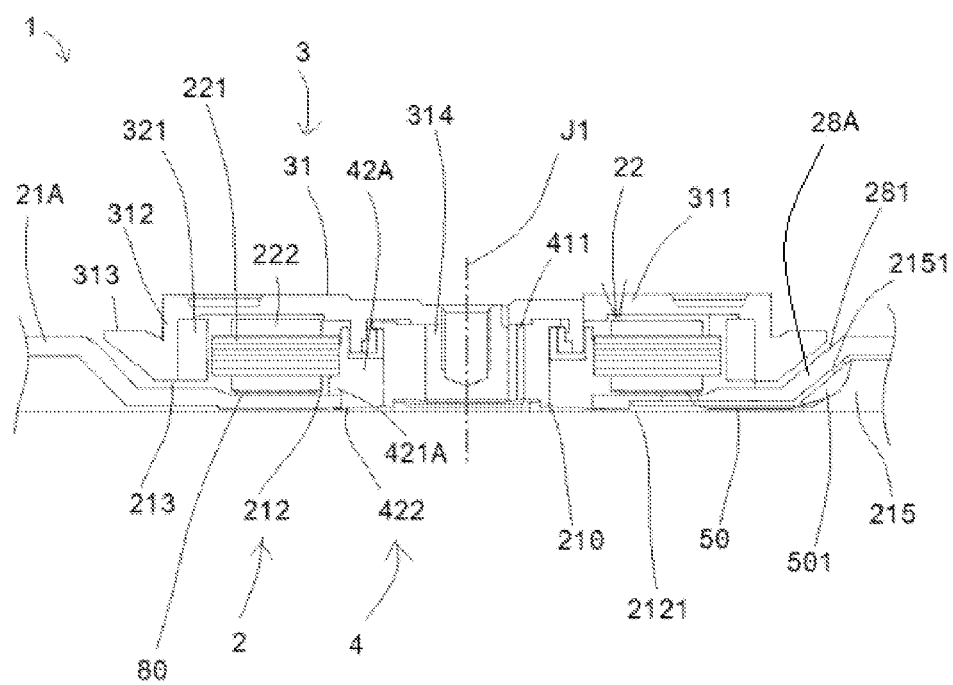
FIG. 7 is a sectional view of a motor according to a modified example of a preferred embodiment of the present invention.

The base member 21 may not include the tubular portion 211. Referring to FIG. 7, only the hole portion 210 is arranged in the base member 21A. The tubular portion 211 is not arranged in the base member 21A. The bushing (tubular member) 42A preferably includes a step portion 421A. The step portion 421A makes contact with the axial lower surface of the stator core 221 in the axial direction. Consequently, the stator core 221 is positioned in place with respect to the bushing 42A. The step portion 421A makes contact with the axial upper surface of the peripheral edge portion of the hole portion 210. Thus, the bushing 42A is positioned in place with respect to the base member 21A. The bushing 42A is inserted into the hole portion 210. A plurality of caulking portions 422 preferably protrudes radially outward from the axial lower end portion of the bushing 42A. After the bushing 42A is inserted into the hole portion 210, the caulking portions 422 are plastically deformed and caulked. Thus, the bushing 42A is fixed to the base member 21A. The configurations of other portions of the base member 21A preferably remain the same as those of the base member 21. As shown in FIG. 7, a protrusion portion 28A protruding from the lower surface of the base member 21A toward the upper surface thereof is provided on the upper inner surface of the second recess portion 213 of the base member 21A. The protrusion portion 28A is axially opposed to the rotary unit 3. More specifically, the protrusion portion 28A is axially opposed to the disk placing portion 313 of the rotor hub 31 with a clearance left therebetween. As shown in FIG. 7, the clearance between the protrusion portion 28A and the rotary unit 3 is smaller than the clearance between the portion of the upper inner surface of the second recess portion 213 other than the protrusion portion 28A and the rotary unit 3.

The base member 21A is preferably formed by, for example, a press working. During the press working, an undercut is formed at one end of the hole portion 210 in a punching direction in which the base member 21A is punched by the mold. A burr is formed at the other end of the hole portion 210 in the punching direction. The burr formed in the hole portion 210 is preferably removed by a cutting or the like. The step portion 421A may be formed by, for example, a press work, a cutting work, or both.

In the structure described above, the lead wires 50 are preferably soldered to the wiring substrate 14 in the position of the lower side of the base member 21 where the lower slant surface 2151 is provided. However, the lead wires 50 need not be necessarily soldered in the position where the lower slant surface 2151 of the base member 21 is provided. In other words, the first electrode portion 141 may be positioned radially outward of the portion where the third recess portion 215 is provided. Moreover, the first electrode portion 141 may be arranged radially outward of the second recess portion 213. In that case, the second electrode portion 142 is arranged radially outward of the position shown in FIG. 6. On the lower surface of the base member 21, the portion existing radially outward of the third recess portion 215 and the second recess portion 213 is a flat portion. In the flat portion, it is therefore easy to press the wiring substrate 14 against the base member 21. As a result, the task of soldering the lead wires 50 to the wiring substrate 14 can be performed with ease.

As shown in FIG. 7, an insulating sheet 80 may be arranged inside the first recess portion 212. The insulating sheet 80 preferably has an annular or substantially annular shape about the center axis J1. The insulating sheet 80 is axially opposed to the coils 222. The insulating sheet 80 is opposed to the radial outer surface of the first recess portion 212. Thus, the insulating sheet 80 is positioned in place within the first recess portion 212. It is therefore possible for the insulating sheet 80 to provide insulation even when the coils 222 make contact with the base member 21A. A plurality of insulating sheets 80 may be arranged side by side along the circumferential direction so as to face the coils 222 in the axial direction. In that case, when seen in a plan view, each of the insulating sheets 80 may preferably have a variety of shapes, e.g., a polygonal shape such as, for example, a rectangular shape or a triangular shape, a circular shape, an elliptical shape, or a sector-like shape. The shape of the insulating sheets 80 is not particularly limited. The insulating sheets 80 may preferably be fixed to the base member 21 through, for example, a sticky material or an adhesive agent or may be arranged inside the first recess portion 212 without having to use the sticky material or the adhesive agent.

The motor 1 of the aforementioned preferred embodiment is preferably a three-phase motor. However, the number of phases of the motor 1 need not be particularly limited. For example, it may be possible to provide a single-phase motor or a multiple-phase motor such as, for example, a five-phase motor or a seven-phase motor. In that case, the number of the first electrode portion 141 and the second electrode portion 142 may be changed in conformity with the number of the lead wires 50 or the handling method of the common wire.

Preferred embodiments of the present invention can be used in a motor for a disk drive apparatus or in a motor for other applications than the disk drive apparatus.

Features of the above-described preferred embodiments and the modifications thereof may be combined appropriately as long as no conflict arises.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A base unit for use in a disk drive apparatus, comprising:
a stator including a plurality of coils; and
a base member; wherein
the base member includes a hole portion through which a center axis passes, a first recess portion arranged on an upper surface of the base member to surround the hole portion and to accommodate at least a portion of the stator and depressed toward a lower surface of the base member, a second recess portion arranged radially outward of the first recess portion on the upper surface of the base member and depressed toward the lower surface of the base member, and at least one through-hole arranged in the first recess portion to extend through the upper surface of the base member and the lower surface of the base member;
the second recess portion including a protrusion portion arranged on an upper inner surface of the second recess portion to protrude from the lower surface of the base member toward the upper surface of the base member and a third recess portion depressed from the lower surface of the base member toward the upper surface of the base member in a lower-surface-side peripheral edge portion of the second recess portion and positioned at an opposite side from the protrusion portion.

2. The base unit of claim 1, wherein the protrusion portion includes an upper slant surface inclined with respect to the center axis and the third recess portion includes a lower slant surface inclined with respect to the center axis.

3. The base unit of claim 1, wherein the through-hole includes a plurality of through-holes arranged in the first recess portion, and the plurality of through-holes include a first through-hole and a second through-hole spaced apart from each other in a circumferential direction.

4. The base unit of claim 3, wherein the radial distances from the center axis to the first through-hole and the second through-hole are equal or substantially equal to each other.

5. The base unit of claim 1, wherein the first recess portion includes a bottom, the second recess portion includes a bottom, and a portion of the bottom of the first recess portion and a portion of the bottom of the second recess portion are arranged on a coplanar surface at a side of the lower surface of the base member.

6. The base unit of claim 5, wherein the through-hole includes a first through-hole, a second through-hole, and a third through-hole arranged in the first recess portion;
the first through-hole, the second through-hole, and the third through-hole are sequentially arranged along a circumferential direction;
the lower surface of the base member positioned between the first through-hole and the second through-hole is a portion of the coplanar surface;
the lower surface of the base member positioned between the second through-hole and the third through-hole is a portion of the coplanar surface; and
the lower surface of the base member positioned between the second through-hole and the bottom of the second recess portion located radially outward of the second through-hole is a portion of the coplanar surface.

7. The base unit of claim 6, wherein the lower surface of the base member positioned around the first through-hole is a portion of the coplanar surface and extends along an edge of the first through-hole.

8. The base unit of claim 6, wherein the lower surface of the base member positioned around the third through-hole is a portion of the coplanar surface and extends along an edge of the third through-hole.

9. The base unit of claim 6, wherein the lower surface of the base member positioned around the second through-hole is a portion of the coplanar surface and is parallel or substantially parallel to a portion of the third recess portion.

10. The base unit of claim 6, wherein the coplanar surface includes at least a pair of parallel or substantially parallel edges.

11. The base unit of claim 1, further comprising a wiring substrate electrically connected to the stator, wherein the coils include at least one lead wire led out from the upper surface of the base member to the lower surface of the base member through the through-hole, and the at least one lead wire is connected to the wiring substrate on a side of the lower surface of the base member.

12. The base unit of claim 11, wherein the first recess portion includes a bottom in which the through-hole is arranged, and the wiring substrate is radially opposed to the bottom of the first recess portion.

13. The base unit of claim 12, wherein the third recess portion includes a lower slant surface inclined with respect to the center axis, at least a portion of the wiring substrate makes contact with the lower slant surface of the third recess portion, and the lead wire is connected to the wiring substrate on the lower slant surface of the third recess portion.

14. The base unit of claim 12, wherein the lead wire is connected to the wiring substrate in a position radially outward of the third recess portion.

15. The base unit of claim 1, wherein the first recess portion includes a bottom, the second recess portion includes a bottom, and the bottom of the second recess portion is positioned axially above the bottom of the first recess portion.

16. A motor, comprising:
a stationary unit including the base unit of claim 1;
a rotary unit including a rotor magnet opposed to the stator, the rotary unit being arranged to rotate with respect to the stationary unit about the center axis; and
a wiring substrate electrically connected to the stator.

17. The motor of claim 16, wherein the protrusion portion includes an upper slant surface radially opposed to the rotary unit.

18. The motor of claim 16, wherein the stator includes a bearing mechanism arranged to rotatably support the rotary unit, the bearing mechanism includes a tubular bushing arranged to support the stator, and the bushing is inserted into the hole portion of the base member and fixed to the base member by press-fitting or caulking.

19. A disk drive apparatus, comprising:
the motor of claim 16;
at least one disk held and rotated by the motor; and
a housing arranged to accommodate the motor and the disk.

20. A base unit for use in a disk drive apparatus, comprising:
a base member;
a stator including a plurality of coils; and
a wiring substrate arranged on a lower surface of the base member and electrically connected to the stator; wherein
the base member includes a hole portion through which a center axis passes, a first recess portion arranged on an upper surface of the base member to surround the hole portion and to accommodate at least a portion of the stator and depressed toward the lower surface of the base member, a second recess portion arranged radially outward of the first recess portion on the upper surface of the base member and depressed toward the lower surface of the base member, and at least one through-hole arranged in the first recess portion to extend through the upper surface of the base member and the lower surface of the base member;
the second recess portion includes a third recess portion depressed from the lower surface of the base member toward the upper surface of the base member in a lower-surface-side peripheral edge portion of the second recess portion;
the third recess portion includes a lower slant surface, the wiring substrate including an electrode portion arranged in a position corresponding to the lower slant surface; and
the coils include a lead wire led out from the upper surface of the base member to the lower surface of the base member through the through-hole, the lead wire connected to the electrode portion of the wiring substrate.

21. The base unit of claim 20, wherein the through-hole includes a plurality of through-holes arranged in the first recess portion, the lead wire includes a plurality of lead wires led out from the coils, the lead wires are led out from the upper surface of the base member to the lower surface of the base member through the respective through-holes, and the lead wires are connected to the electrode portion of the wiring substrate.

22. The base unit of claim 20, wherein the electrode portion includes three electrodes corresponding to U, V, and W phases, the through-hole includes a plurality of through-holes arranged in the first recess portion, the lead wire includes three lead wires led out from the upper surface of the base member to the lower surface of the base member through the respective through-holes, and the three lead wires are respectively connected to the three electrodes.

23. The base unit of claim 20, wherein the lead wire is soldered to be connected to the wiring substrate.

24. The base unit of claim 23, wherein the first recess portion includes a bottom, and the soldered portion is positioned axially above the bottom of the first recess portion.

25. The base unit of claim 20, wherein the first recess portion includes a bottom, the second recess portion includes a bottom, and the bottom of the first recess portion is positioned axially below the bottom of the second recess portion.

26. The base unit of claim 25, wherein the lower slant surface is positioned axially above the bottom of the first recess portion and the bottom of the second recess portion.

27. The base unit of claim 20, wherein the first recess portion includes a bottom, the second recess portion includes a bottom, the base member includes a coplanar surface arranged on the lower surface of the base member to straddle both the bottom of the first recess portion and the bottom of the second recess portion, and a portion of the bottom of the first recess portion and a portion of the bottom of the second recess portion are arranged on the coplanar surface.

28. The base unit of claim 27, wherein the lead wire extends to the lower slant surface along the coplanar surface.

29. The base unit of claim 27, wherein a portion of the wiring substrate is arranged on the coplanar surface, the wiring substrate axially contacts with the bottom of the first recess portion and the bottom of the second recess portion, and the wiring substrate extends radially outward from the coplanar surface to the lower surface of the base member through the third recess portion.

30. The base unit of claim 27, wherein the coplanar surface is a region surrounded by the peripheral edge portion of the second recess portion, and a first side edge is opposed to the peripheral edge portion and a pair of second side edges.

31. The base unit of claim 30, wherein arc portions interconnecting the first side edge and the second side edges are provided on the lower surface of the base member, and the arc portions are positioned radially inward of the first side edge.

32. The base unit of claim 30, wherein the first side edge is parallel or substantially parallel to at least one side of the lower slant surface.

33. The base unit of claim 27, wherein at least a portion of the coplanar surface is covered with a resin material, and the through-hole is closed by the resin material.

34. The base unit of claim 20, wherein the second recess portion includes a protrusion portion arranged on an upper inner surface of the second recess portion to protrude from the lower surface of the base member toward the upper surface of the base member, and the third recess portion is positioned at an opposite side from the protrusion portion.

35. The base unit of claim 34, wherein the protrusion portion includes an upper slant surface inclined with respect to the center axis, and the upper slant surface is parallel or substantially parallel to the lower slant surface.

36. A motor, comprising:
a stationary unit including the base unit of claim 20; and
a rotary unit including a rotor magnet opposed to the stator, the rotary unit arranged to rotate with respect to the stationary unit about the center axis.

37. A disk drive apparatus, comprising:
the motor of claim 36;
at least one disk held and rotated by the motor; and
a housing arranged to accommodate the motor and the disk.

38. A motor, comprising:
a stationary unit including a base unit; and
a rotary unit including a rotor magnet, the rotary unit arranged to rotate with respect to the stationary unit about a center axis; wherein
the base unit includes a base member, a stator including a plurality of coils, and a wiring substrate arranged on a lower surface of the base member and electrically connected to the stator;
the base member includes a hole portion through which a center axis passes, a first recess portion arranged on an upper surface of the base member to surround the hole portion and to accommodate at least a portion of the stator and depressed toward the lower surface of the base member, a second recess portion arranged radially outward of the first recess portion on the upper surface of the base member and depressed toward the lower surface of the base member, and at least one through-hole arranged in the first recess portion to extend through the upper surface of the base member and the lower surface of the base member;
the second recess portion includes a protrusion portion arranged on an upper inner surface of the second recess portion to protrude from the lower surface of the base member toward the upper surface of the base member and a third recess portion depressed from the lower surface of the base member toward the upper surface of the base member in a lower-surface-side peripheral edge portion of the second recess portion and positioned at the opposite side from the protrusion portion; and
the upper inner surface of the second recess portion including the protrusion portion is axially opposed to the rotary unit.

39. The motor of claim 38, wherein a clearance between the protrusion portion and the rotary unit is smaller than a clearance between the portion of the upper inner surface of the second recess portion other than the protrusion portion and the rotary unit.

40. The motor of claim 38, wherein the protrusion portion includes an upper slant surface inclined with respect to the center axis, and the third recess portion includes a lower slant surface inclined with respect to the center axis.

41. The motor of claim 40, wherein the upper slant surface and the lower slant surface are parallel or substantially parallel to each other.

42. The motor of claim 38, wherein the through-hole includes a plurality of through-holes arranged in the first recess portion, a lead wire includes a plurality of lead wires led out from the coils, the plurality of lead wires is led out from the upper surface of the base member to the lower surface of the base member through respective ones of the plurality of through-holes, and the plurality of lead wires is connected to the wiring substrate in the third recess portion.

43. The motor of claim 38, wherein the wiring substrate includes an electrode portion including three electrodes corresponding to U, V, and W phases, the through-hole includes a plurality of through-holes arranged in the first recess portion, a lead wire includes three lead wires led out from the upper surface of the base member to the lower surface of the base member through respective ones of the plurality of through-holes, and the three lead wires are respectively connected to the three electrodes in the third recess portion.

44. The motor of claim 38, wherein three lead wires are soldered to be connected to the wiring substrate.

45. The motor of claim 44, wherein the first recess portion includes a bottom and a soldered portion is positioned axially above the bottom of the first recess portion.

46. The motor of claim 38, wherein the first recess portion includes a bottom, the second recess portion includes a bottom, and the bottom of the first recess portion is positioned axially below the bottom of the second recess portion.

47. The motor of claim 46, wherein the third recess portion includes a lower slant surface positioned axially above the bottom of the first recess portion and the bottom of the second recess portion.

48. The motor of claim 38, wherein the first recess portion includes a bottom, the second recess portion includes a bottom, the base member includes a coplanar surface arranged on the lower surface of the base member to straddle both the bottom of the first recess portion and the bottom of the second recess portion, and a portion of the bottom of the first recess portion and a portion of the bottom of the second recess portion are arranged on the coplanar surface.

49. The motor of claim 48, wherein the third recess portion includes a lower slant surface and a lead wire extends to the lower slant surface along the coplanar surface.

50. The motor of claim 48, wherein a portion of the wiring substrate is arranged on the coplanar surface, the wiring substrate axially contacts the bottom of the first recess portion and the bottom of the second recess portion, and the wiring substrate extends radially outward from the coplanar surface to the lower surface of the base member through the third recess portion.

51. The motor of claim 48, wherein the coplanar surface is a region surrounded by the peripheral edge portion of the second recess portion, and a first side edge is opposed to the peripheral edge portion and a pair of second side edges.

52. The motor of claim 51, wherein the third recess portion includes a lower slant surface, and the first side edge is parallel or substantially parallel to at least one side of the lower slant surface.

53. The motor of claim 48, wherein at least a portion of the coplanar surface is covered with a resin material, and the through-hole is closed by the resin material.

54. A disk drive apparatus, comprising:
the motor of claim 38;
at least one disk held and rotated by the motor; and
a housing arranged to accommodate the motor and the disk.

\* \* \* \* \*